(12) United States Patent
Forest et al.

(10) Patent No.: US 11,294,467 B2
(45) Date of Patent: Apr. 5, 2022

(54) SYSTEMS AND METHODS FOR INTEGRATING ENVIRONMENTAL HAPTICS IN VIRTUAL REALITY

(71) Applicant: Immersion Corporation, San Jose, CA (US)

(72) Inventors: Simon Forest, Montreal (CA); Razmik Mousakhanian, Kirkland (CA); Liwen Wu, Montreal (CA); Vincent Levesque, Montreal (CA); Channy Uon, Montreal (CA)

(73) Assignee: Immersion Corporation, San Francisco, CA (US)

( * ) Notice: Subject to any disclaimer, the term of this patent is extended or adjusted under 35 U.S.C. 154(b) by 0 days.

(21) Appl. No.: 16/224,162

(22) Filed: Dec. 18, 2018

(65) Prior Publication Data

US 2020/0192479 A1    Jun. 18, 2020

(51) Int. Cl.
*G06F 3/01* (2006.01)
*G06T 19/00* (2011.01)

(52) U.S. Cl.
CPC .............. *G06F 3/016* (2013.01); *G06F 3/012* (2013.01); *G06T 19/006* (2013.01)

(58) Field of Classification Search
CPC ........ G06F 3/012; G06F 3/016; G06T 19/006
See application file for complete search history.

(56) References Cited

U.S. PATENT DOCUMENTS 8,876,688 B2 * 11/2014 Hyde ..................... G16H 10/20
600/21
9,478,109 B2 * 10/2016 Rihn ........................ G08B 6/00
(Continued)

FOREIGN PATENT DOCUMENTS

EP    2778845    9/2014
EP    2778850    9/2014
(Continued)

OTHER PUBLICATIONS

Castrol Limited, "Castrol EDGE Blurs Reality & Virtual Reality In 'Virtual Drift'", 2015, video retrieved via internet at https://www.vrfocus.com/2015/05/castrol-edge-blurs-reality-virtual-reality-in-promotional-video-virtual-drift/.
(Continued)

*Primary Examiner* — Ryan R Yang
(74) *Attorney, Agent, or Firm* — Kilpatrick Townsend & Stockton LLP

(57) ABSTRACT

Systems and methods for integrating environmental haptic effects in virtual reality are disclosed. One illustrative system described herein includes a sensor for detecting an environmental condition, the environmental condition associated with an environmental haptic effect, and generating a sensor signal. The system also includes a virtual reality display configured to output a virtual reality effect. The system also includes a processor coupled to the sensor and a virtual reality display, the processor configured to: receive the sensor signal, determine a modification to the virtual reality effect based in part on the sensor signal, and transmit a display signal associated with the modification to the virtual reality display. Another illustrative system includes a sensor for detecting an environmental condition, the environmental condition associated with an environmental haptic effect, and generating a sensor signal, and a virtual reality display configured to output a virtual reality effect. The system also includes a processor coupled to the sensor and a virtual reality display, the processor configured to: receive the sensor signal, determine a generated haptic effect based at least in part of the sensor signal that when combined with the environmental haptic effect produces the desired haptic effect, and transmit a haptic signal associated with the generated haptic effect to a haptic output device.

13 Claims, 4 Drawing Sheets

(56) References Cited

U.S. PATENT DOCUMENTS

| | | | |
|---|---|---|---|
| 10,031,580 B2* | 7/2018 | Cruz-Hernandez | G06F 3/016 |
| 10,146,308 B2* | 12/2018 | Cruz-Hernandez | G06F 3/016 |
| 10,180,734 B2* | 1/2019 | Miller | G06F 3/0346 |
| 10,269,162 B2* | 4/2019 | McMahan | G06T 11/60 |
| 10,504,295 B2* | 12/2019 | Kopper | A61B 6/12 |
| 2011/0043537 A1* | 2/2011 | Dellon | G09B 9/00 345/647 |
| 2011/0187651 A1 | 8/2011 | Whitlow et al. | |
| 2015/0022443 A1* | 1/2015 | Richter | G06F 3/016 345/156 |
| 2015/0268724 A1* | 9/2015 | Levesque | G06F 1/1694 345/156 |
| 2015/0331576 A1* | 11/2015 | Piya | G06F 3/04815 715/850 |
| 2015/0355711 A1* | 12/2015 | Rihn | A63F 13/5252 340/407.2 |
| 2016/0189493 A1* | 6/2016 | Rihn | G08B 6/00 340/407.1 |
| 2017/0186244 A1* | 6/2017 | Cloux | G06T 19/20 |
| 2017/0287223 A1 | 10/2017 | Xu | |
| 2018/0039302 A1* | 2/2018 | Levesque | G06F 3/0487 |
| 2018/0040163 A1* | 2/2018 | Donnelly | G06F 3/017 |
| 2018/0081426 A1 | 3/2018 | Rothkopf | |
| 2018/0357836 A1 | 12/2018 | Ishiguro et al. | |
| 2020/0117898 A1* | 4/2020 | Tian | G06T 7/11 |

FOREIGN PATENT DOCUMENTS

| | | |
|---|---|---|
| EP | 2821912 | 1/2015 |
| WO | 2018057980 | 3/2018 |

OTHER PUBLICATIONS

Samsung Electronics America, Inc., Six Flags, "New Revolution Virtual Reality Coaster," retrieved via internet at https://www.sixflags.com/greatescape/attractions/vr/overview.

PCT Application No. PCT/US2019/066464, International Search Report and Written Opinion, dated Mar. 25, 2020, 11 pages.

* cited by examiner

SYSTEMS AND METHODS FOR INTEGRATING ENVIRONMENTAL HAPTICS IN VIRTUAL REALITY

FIELD OF THE INVENTION

The present application relates to the field of user interface devices. More specifically, the present application relates to integrating environmental haptics in virtual reality.

BACKGROUND

Virtual and Augmented Reality ("VR" and "AR")) applications have become increasingly popular. Such applications may be used in situations in which the user is likely to experience haptic effects emanating from the real-world environment. For example, a VR user may be experiencing a VR environment—watching a video or playing a game—while traveling in a vehicle, such as a plane, train, car, or boat. In each of these vehicles, the user is likely to feel haptic effects that have nothing to do with the VR experience and may thus detract from it. Accordingly, systems and methods for integrating environmental haptics in virtual reality are needed.

SUMMARY

Embodiments of the present disclosure comprise systems and methods for integrating environmental haptics in virtual reality. In one embodiment, a system comprises a sensor for detecting an environmental condition, the environmental condition associated with an environmental haptic effect, and generating a sensor signal. The system also comprises a virtual reality display configured to output a virtual reality effect, such as a visual or auditory effect. The system also comprises a processor coupled to the sensor and a virtual reality display, the processor configured to: receive the sensor signal, determine a modification to the virtual reality effect based in part on the sensor signal, and transmit a signal associated with the modification to the virtual reality display.

In another embodiment, a system comprises a sensor for detecting an environmental condition, the environmental condition associated with an environmental haptic effect, and generating a sensor signal, and a virtual reality display configured to output a virtual reality effect. The system also comprises a processor coupled to the sensor and a virtual reality display, the processor configured to: receive the sensor signal, determine a generated haptic effect based at least in part of the sensor signal that when combined with the environmental haptic effect produces the desired haptic effect, and transmit a haptic signal associated with the generated haptic effect to a haptic output device.

In another embodiment, a method for integrating environmental haptics in virtual reality comprises receiving a sensor signal from a sensor configured to detect an environmental condition, the environmental condition associated with an environmental haptic effect, and generate the sensor signal. The method further comprises determining a modification to a virtual reality effect based in part on the sensor signal, and transmitting a display signal associated with the modification to a virtual reality display.

In another embodiment, a method comprises receiving a sensor signal from a sensor configured to detect an environmental condition associated with an environmental haptic effect and generating the sensor signal. The method further comprises determining a desired haptic effect to be output to a user, determining a generated haptic effect based at least in part of the sensor signal that when combined with the environmental haptic effect produces the desired haptic effect, and transmitting a haptic signal associated with the generated haptic effect to a haptic output device In yet another embodiment, a non-transitory computer readable medium may comprise program code, which when executed by a processor is configured to perform such methods.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
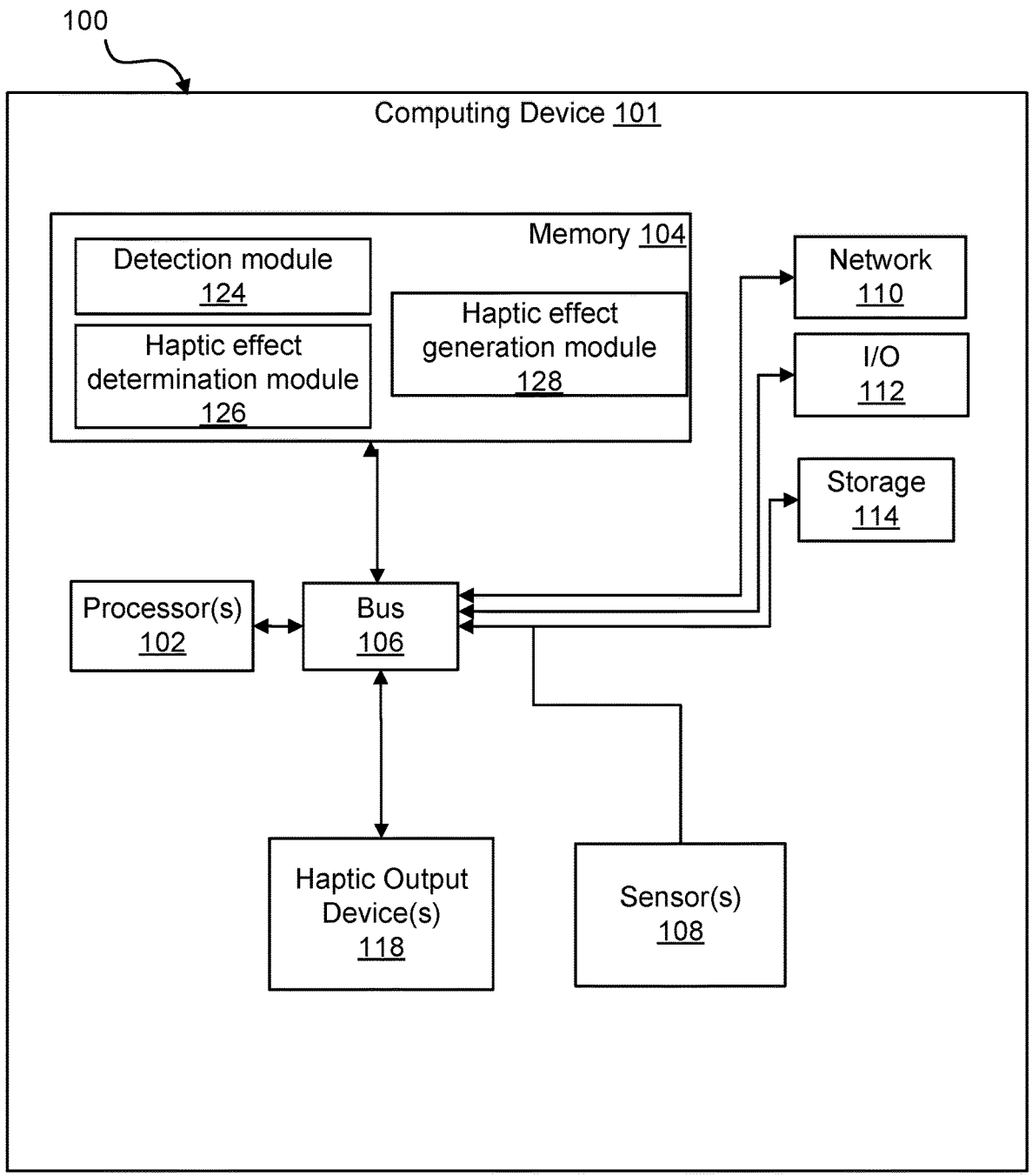
FIG. 1 shows an illustrative system for integrating environmental haptics in virtual reality.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of Integrating Environmental Haptics in Virtual Reality Embodiments allow VR simulations to adapt to real-world environmental haptics. Such embodiments may allow a user to enjoy a VR simulation without experiencing the real-world haptics. Alternatively, such an embodiment may seamlessly incorporate real-world haptic effects into a VR simulation so that the user is unaware of the source of the haptic effect. In other embodiments, real-world haptic effects may be combined with generated haptic effects so that the user experiences a particular desired haptic effect.

In one illustrative embodiment, a user is flying in a passenger airplane while wearing a virtual reality ("VR") headset and experiencing a VR movie. In the simulation, real-world environmental conditions may cause an environmental haptic effect. For example, the seat or wall of the airplane might be portrayed as a barrier in the VR simulation. The passenger may also experience haptic effects based on movement of the airplane, such as when the airplane climbs or descends or when the airplane flies through turbulence. One or more sensors in the airplane, such as an accelerometer or radar, detect the environmental condition and are able to predict the haptic effect or alternatively, sensors are able to detect the haptic effect itself that is associated with an environmental condition, e.g., the shaking of the plane due to turbulence.

In one illustrative embodiment, information from the sensor(s) is passed to a processor that is also processing and displaying the VR movie. The VR movie can then be modified in real-time to reflect the environmental haptic effects. In addition, or alternatively, haptic effects can be output to minimize or alter the real world haptic effect. For instance, in one illustrative embodiment, the VR movie is not modified. Instead, a haptic output device generates a haptic effect that is designed to counteract or eliminate the environmental haptic effect.

In such embodiments, the sensor or sensors are used to detect events as or before they happen. For example, in the case of turbulence in-flight, a radar might sense that a particular area of unsettled air in the airplane's flight path will cause a particular effect and then modify a VR video displayed in a headset to reflect the predicted environmental haptic effect as it occurs. Similarly, in an embodiment designed to counteract the environmental haptic effect, the processor can predict the haptic effect and then produce the counteracting haptic effect at the same time that the user experiences the environmental haptic effects. These examples are merely illustrative and not meant to limit the scope of the claims.

Illustrative Systems for Integrating Environmental Haptics in Virtual Reality

FIG. 1 shows an illustrative system 100 for integrating environmental haptics in virtual reality. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more displays, such as VR headsets or touch screen displays, keyboards, mice, speakers, microphones, cameras, and/or other hardware used to input data or output data. Storage 114 represents nonvolatile storage such as magnetic, optical, or other storage media included in device 101. In some embodiments, I/O components 112 may comprise VR controllers. In other embodiments, I/O components may comprise a controller in a transportation device, such as a car, or boat. In yet other embodiments, the controllers may be the user's hands, and sensors 108 may be able to detect the movements and gestures in free space.

System 100 further includes one or more sensors 108. The sensors 108 are configured to detect an environmental effect and provide appropriate data for use by processor 102. Any suitable number, type, or arrangement of sensors can be used. For example, different embodiments may include accelerometers, gyrometers/gyroscopes, pressure sensors, magnetic sensors, light sensors, microphones, capacitive sensors, touch sensors or any combination of such sensors. In one embodiment, a camera, laser mapping, or radar scanning is used to identify the environment around the user. Such an embodiment may utilize artificial intelligence ("AI") to make the identification. An accelerometer may be used to detect vibration, displacement, and speed. A gyrometer or gyroscope may be used to sense rotation. A pressure sensor may be used to determine altitude and a magnetic sensor to determine direction or orientation. A light sensor may be used to determine perceived luminosity. And a microphone may be used to detect sound. Any of these sensors may be used in combination with any other sensor.

In other embodiments, the sensor 108 may comprise an LED detector. In some embodiments, the processor 102 is in communication with a single sensor 108, in other embodiments, the processor 102 is in communication with a plurality of sensors 108.

Although a single haptic output device 118 is shown here, embodiments may use multiple haptic output devices of the same or different type to output haptic effects. For example, haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA), a low profile haptic actuator, a haptic tape, or a haptic output device configured to output an electrostatic effect, such as an Electrostatic Friction (ESF) actuator. In some embodiments, haptic output device 118 may comprise a plurality of actuators, for example a low profile haptic actuator, a piezoelectric actuator, and an LRA. Further, haptic output device 118 may be integrated into the user environment or into the user's clothing or a wearable device.

Turning to memory 104, exemplary program components 124, 126, and 128 are depicted to illustrate how a device may be configured to determine and output haptic effects. In this example, a detection module 124 configures processor 102 to monitor sensor(s) 108 to determine an environmental condition. For example, module 124 may sample sensor 108 in order to track one or more of the location, path, velocity, acceleration, pressure, and/or other characteristics of environmental haptic conditions over time.

Haptic effect determination module 126 represents a program component that analyzes data regarding audio and video characteristics to select a haptic effect to generate. Particularly, module 126 comprises code that determines, based on the environmental conditions and VR environment, an effect to generate and output by the haptic output device. Module 126 may further comprise code that selects one or more existing haptic effects to output in response to detection of an environmental condition. For example, detection of strong turbulence in an aircraft may trigger generation of a strong vibration to counter the effect of the turbulence on the user. Different haptic effects may be selected based on various combination of these features.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of haptic effect and utilize signal processing algorithms to generate an appropriate signal to send to haptic output device 118. As a further example, a desired haptic effect may be indicated along with target coordinates for the texture and an appropriate waveform sent to one or more actuators to generate appropriate displacement of the surface (and/or other device components) to provide the haptic effect. Some embodiments may utilize multiple haptic output devices in concert to simulate a feature. For example, an environmental disturbance may be sensed. However, the desired haptic effect may have little or no vibration but include a kinesthetic component. In such a case, a vibration may be utilized to counter the environmental disturbance while, simultaneously, a kinesthetic effect is output to indicate the presence of an object, such as a table in the user's environment. Such a configuration is merely illustrative and not the sole way in which such a system may be constructed.

Figure 2:
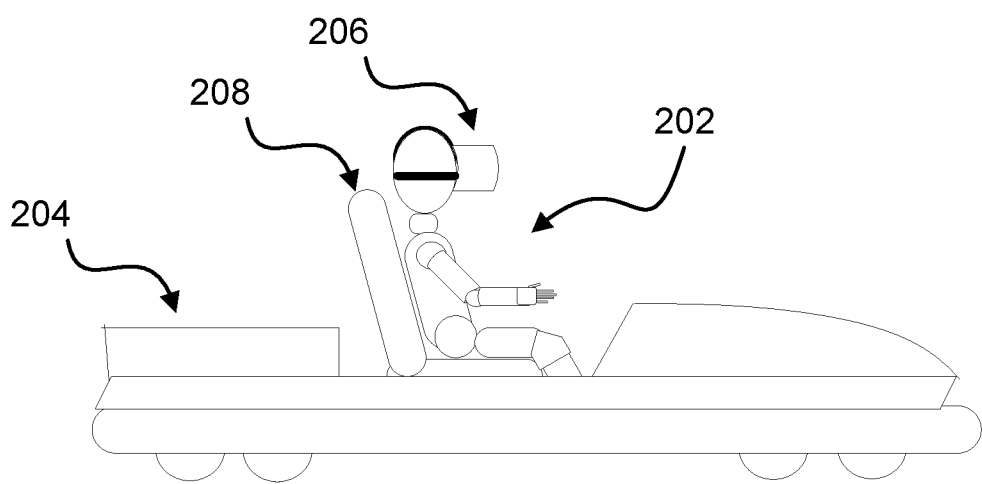
FIG. 2 shows another illustrative system for integrating environmental haptics in virtual reality.

FIG. 2 shows another illustrative system for integrating environmental haptics in virtual reality. The system in FIG. 2 is for use on a rollercoaster. In the embodiment shown in FIG. 2, a user 202 is seated in a rollercoaster car 204. The rollercoaster car 204 carries the user along a track may incorporate the system illustrated in FIG. 1 for sensing environmental haptic effects as well as for determining, generating and outputting haptic effects.

In the embodiment shown, the user 202 is wearing a VR headset 206. The VR headset 206 includes a visual display as well as headphones. The VR headset 206 may also include one or more haptic actuators, such as an LRA, for providing haptic effects to the user.

The rollercoaster car 202 includes a seat 208 in which the user 202 sits. In the embodiment shown, the seat 208 includes various haptic output devices for providing haptic output to the user 202. In some embodiments, the user might also wear clothing, such as a pair of gloves, that includes haptic actuator devices.

As the rollercoaster car 204 traverses a track, sensors in the car 204 can sense movement of the car and predict events that are about to occur. For instance, as the car nears a chain to be lifted up a hill, a photo sensor in the front of the car 204 senses the chain and predicts when the chain dogs will engage the chain. As the chain dogs engage the chain, other sensors in the car 204 sense the vibration, i.e., the click-clack-click sensation. As the sensors sense the vibration, haptic output devices in the seat 208 output counteracting vibrations to smooth the feeling of the car 204 as the chain dogs engage. Such an embodiment may be useful when the VR headset 206 is playing a flight simulation coinciding with the motions of the car 204. The counteracting haptic feedback will cause the user to experience a smoother ride that is more akin to flying than riding in a rollercoaster. Other types of actuators could be used to, for example, apply pressure on the user's body to counteract forces of the rollercoaster. Further, in some embodiments, the user might wear additional actuators over various parts of the body to achieve a more immersive experience.

Various embodiments can be useful in several scenarios. For instance, a user is playing an immersive VR game while on a long flight. As the user walks over a bridge in the simulation, an earthquake shakes the virtual world. The embodiment is able to cause the bridge to shake under the user, the tree in the forest to shake, and rocks to fall off a nearby cliff, all in response to the sensed turbulence. Such an embodiment provides an extremely realistic experience while masking the turbulence on the plane.

As another example, a user is playing a VR racing game while riding as a passenger in a car. The game is set in the future and the virtual road can change at any time. Suddenly, the user sees the road become bumpy, hears the change as the tires encounter the bumps, and feels the change in texture. The changes to the simulated racing game were caused by the fact that the real car is now traveling along a gravel road. As the real car approaches a pot-hole, a camera in the front of the car detects the pothole and determines a modification to make to the simulation. Then, when the car hits the pothole, the user feels a bump from a haptic output device on his side and turns towards that direction where a simulated explosion is displayed, thereby incorporating the environmental haptic effect into the simulation.

In another example, a user is in a simulation, relaxing in the shallow water of a blue ocean. The user feels something brushing against the user's right arm and turns to see a fish moving away and may hear the water being displaced by the fish. The user is actually lying down in a living room and another person has just accidentally brushed the user while walking past. The system sensed the contact about to occur and modified the VR simulation and generated and output a corresponding haptic effect in order to maintain the user's immersion in VR.

In yet another example, a user is walking in a virtual jungle while wearing a VR headset. The furniture and walls the user's living room are mapped to objects in the VR simulation. The branch of a tree appears where an overhanding lamp appears and his coffee table looks like a large rock. The forest gets denser where the walls are. As the user approaches any of these objects, the system is able to generate and output corresponding haptic effects, automatically adapting to the real-world environment around the user. In so doing, the simulation may allow the user to avoid or interact with objects in the real world as if they were objects in the virtual world.

Illustrative Methods for Integrating Environmental Haptics in Virtual Reality

Figure 3:
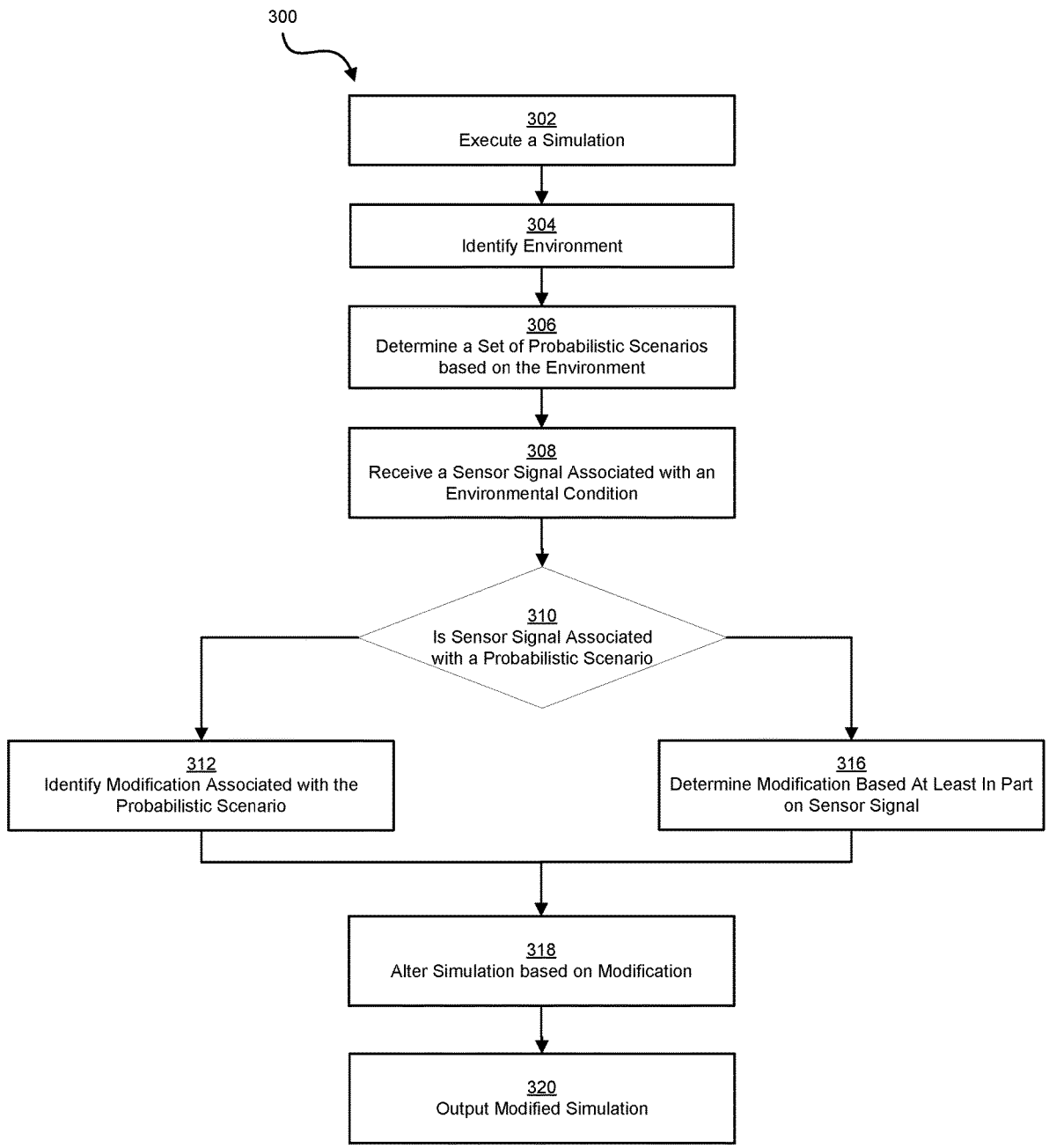
FIG. 3 is a flow chart of method steps for one example embodiment for integrating environmental haptics in virtual reality.

FIG. 3 is a flow chart of method steps for one example embodiment for integrating environmental haptics in virtual reality. In the embodiment shown, a process 300 begins by a processor, such as processor 102, executing a simulation 302.

The processor 102 also receives sensor signals from one or more sensors 108. Using the sensor signals, the processor 102 analyzes the environment to identify the environment in which the user is experiencing the simulation 304. For example, the sensor signal may indicate that the user is on a rollercoaster as described above in relation to FIG. 2. In some embodiments, the environment may be identified before the simulation begins or may be hard-coded into the computing device 100.

The processor 102 next determines a set of probabilistic scenarios based on the environment 306. For example, if the simulation begins to execute in an airplane, the sensor 108 may send one or more signals indicating that the airplane is on the ground. The processor 102 would then identify scenarios associated with taxiing or takeoff as the two most likely scenarios to occur in the near future. The processor may rely on artificial intelligence algorithms to make identify the most likely scenarios.

The processor 102 then receives a sensor signal from the sensor 108 associated with an environmental conduction

308. For instance, an accelerometer or speed sensor in an airplane might indicate that the airplane is beginning to move. Or in the case of a rollercoaster, a sensor may indicate that the car is engaging a chain to pull the car up a hill.

The sensor 108 next determines if the sensor signal is associated with one of the probabilistic scenarios 310. For example, if the plane is sitting still, and the processor determines that it is likely that the plane will begin taxiing, then the sensor signal indicating that the plane has begun to move would match one of the probabilistic scenarios. In the case of a rollercoaster, if the car suddenly stopped, that might not match a probabilistic scenario associated with the rollercoaster traversing a track. In another example, if a car is driving down a road, and the road surface suddenly changes to gravel, traveling along the gravel surface may not be one of the probabilistic scenarios predicted by the processor 102.

If the probabilistic scenario is associated with the sensor signal, then the processor 102 identifies a modification associated with the probabilistic scenario 312. The modification may be a modification to the display in the VR headset. Alternatively, the modification may be a modification to the haptic effect or set of haptic effects provided to the user in response to sensing the environmental condition. In either event, the modification is pre-defined and stored, for example in storage 114, for subsequent retrieval by processor 102.

If the probabilistic scenario is not associated with the sensor signal, then the processor 102 determines a modification based at least in part on the sensor signal 316. As with an existing probabilistic scenario, the modification may be a modification to the display or sounds output by the VR headset or to the haptic effect or set of haptic effects or a combination of these outputs. However, in this case, the processor must identify or generate a modification to the video, audio, and/or haptic effects based at least in part on the sensor signal.

The processor 102 next alters the simulation based on the modification 318. For instance, in the case of air turbulence in an airplane, the video may be modified, for example creating a wave in a boat simulation or an earthquake in a hiking simulation is triggered to fit the properties of the turbulence. Alternatively, the haptic effect determination module 126 may identify haptic effects to counteract the turbulence and combine those haptic effects with the haptic effects to be generated with the simulation.

The processor 102 then outputs the modified simulation 320. For instance, the processor 102 may output the modified video through the VR headset. In another example, the processor 102 may cause a haptic output device 118 to output a haptic effect caused by the air turbulence while the haptic effects associated with the simulation are also output.

In some embodiments, real-world haptics are integrated into a VR simulation. In such an embodiment, a user wears a VR headset while in an uncontrolled environment with possible haptic disturbances caused by environmental conditions. In addition to the example of a plane described herein, this could include a user on a train. A train produces a distinctive rumble while moving at constant speed. It also slows down and speeds up at stations, and can sometimes take relatively sharp turns. Each of these situations or actions could be used to modify a VR simulation to integrate the real-world haptics into the simulation.

Similarly, a car produces different feedback depending on the quality of the road (fresh asphalt, gravel, potholes, snow, etc.). It also produces different haptic sensations when accelerating or decelerating, changing lanes, or turning. A boat may also produce distinctive haptic sensations by rocking, changing speed, or traversing rough water. A user may experience haptics caused by environmental conditions in a public space. For example, the user may feel someone brushing against them, feel the change in texture as they move across various surfaces, feel others touching them, or interact with objects such as furniture or walls. In such embodiments, the haptic disturbances caused by environmental conditions are integrated, at least in part, into a VR simulation in order to maintain the immersive VR experience. In some embodiments, a sensor embedded in the VR headset, such as a camera, or a sensor embedded in a user's clothing, such as a pressure sensor can sense when another person is walking by and modify the simulation accordingly. In another embodiment, the sensor might sense the presence of an object, such as a tree, and modify the VR simulation to show an object to cause the user to avoid a collision with the real-world object.

In another embodiment, a user wears a VR headset during a physical experience that has haptic components. The user experiences the haptics form the physical experience, but they are mapped onto a VR simulation presented to the user through the headset. In other words, as the user controls the physical experience, the VR simulation changes to match the haptics experienced by the user. The haptics may be related to a relatively predictable experience, such as a rollercoaster ride. The haptics could then be synchronized with the various features of the rollercoaster track. Alternatively, the VR simulation may be adapted in real time to a previously unknown experience. For instance, in the case of the rollercoaster example, sensors such as cameras or accelerometers could measure the environments and allow changes to the haptics and VR simulation to occur in real time, such as in response to vertical and horizontal movements of the rollercoaster car as opposed to mapping the effects before the rollercoaster ride begins.

Extra haptic devices can be used to increase the pleasure of haptic experience. For example, when turbulence is detected on a plane, the chair of the plane may include a haptic output device to output haptics to compensate for the turbulence, changing the unpleasant turbulence into a more pleasant user experience. In another example embodiment, a sensor detects a collision in the real world and triggers an event in a VR environment. For example, the user collides the left-hand controller and the right-hand controller to fire weapons in the game. The impact of the collision will map to the power level of the weapon. Extra haptics can be triggered at the same time to simulate resonance of the weapon firing.

In some embodiments, the modification can be characterized as compensation, avoidance, or manipulation. For example, one embodiment is capable of compensating for unpleasant haptics in a real-world environment. The sensor 108 detects an unpleasant haptics sensation experienced by the user or about to be experienced by the user in the real-world environment and generates haptics to compensate for the unpleasant haptics. Such an embodiment can also modify a VR display simultaneously to match the haptic effects. For example, if turbulence is detected, such an embodiment may generate haptics that will cancel the turbulence in a manner that allows the real-world environment haptics to fit the current VR environment. For instance, the user may be viewing a race car game while flying, and the modification of the turbulence effect might cause the car to begin traveling over a gravel road.

Figure 4:
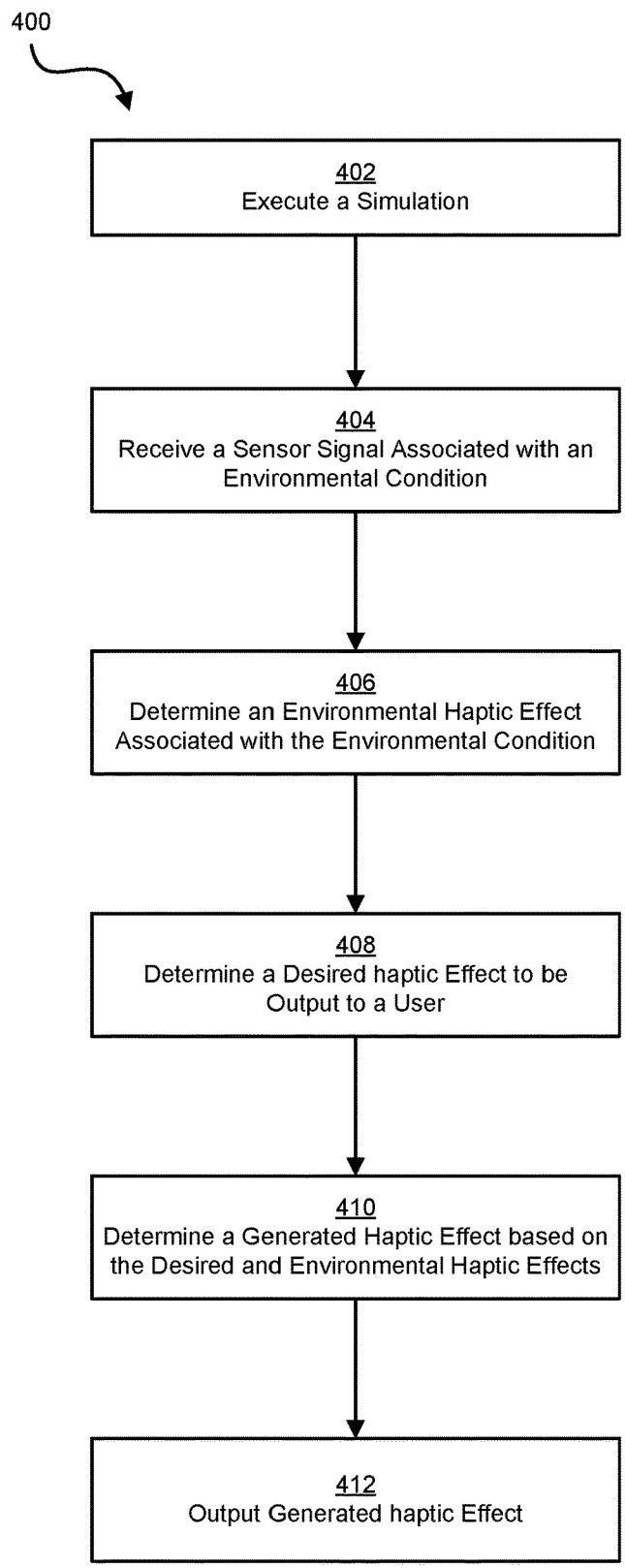
FIG. 4 is a flow chart of method steps for another example embodiment for integrating environmental haptics in virtual reality.

Another embodiment helps the user to avoid unpleasant haptics in a real-world environment. FIG. 4 is a flow chart of method steps for one example embodiment for integrating environmental haptics in virtual reality. In the embodiment shown, a process 400 begins by a processor, such as processor 102, executing a simulation 402.

The processor 102 receives a sensor signal from a sensor 108 that is configured to detect an environmental condition 404. The environmental condition may be a disturbance, such as air turbulence. Alternatively, the environmental condition might be the surface of a road.

The haptic effect determination module 126 next determines an environmental haptic effect associated with the environmental condition 406. For example, the processor 102 may determine that air turbulence is associated with a high magnitude, low frequency haptic effect.

The haptic effect determination module 126 then determines a desired haptic effect to be output to a user 408. For example, the simulation that the user is viewing may be a car driving along a smooth road. And based on the simulation, the desired haptic effect is a low magnitude, high frequency effect that reflects the tires of the car rolling along a road. Thus, the desired haptic effect may be substantially different than the environmental haptic effect.

The haptic effect determination module 126 then determines a generated haptic effect, i.e., a haptic effect to be generated, based on the desired haptic effect and the environmental haptic effect 410. For instance, the haptic effect generation module 128 may generate a haptic effect that provides a low magnitude, high frequency haptic effect and, in addition, a haptic effect to counteract the high magnitude, low frequency environmental haptic effect. The combination of outputting these two effects results in the user perceiving the desired haptic effect. The processor 102 then transmits the haptic effect(s) to a haptic output device 118, which outputs the haptic effect 412.

Such an embodiment can use sensors to sense environmental conditions and based on the sensor output, predict haptics that are likely to occur in the real-world environment. If it is unpleasant one, the application will generate some similar haptics ahead to alert the user to change their direction, position, rotation, body pose, and so on to avoid unpleasant situation happens. For example, the user is standing in a crowd bus and wearing a VR device. The application detects someone will pass by and hit the user's left shoulder, and it generates haptics to alert the user to rotate his body to avoid the foreseen collision.

Yet another embodiment manipulates haptic effects to adopt proper haptic effects in a real-world environment. In such an embodiment, a sensor or sensors detects environmental haptic effects and uses those effects in combination with generated haptic effect to fit a scenario in a VR environment. For example, if a user places her hands on a table in the real world, and her avatar does the same in a VR environment, the real-world haptics can be used without any additional generated haptics. However, if the real tale is a wood table, while the virtual table is a glass table, the application will generate haptics to make the user feel that she is touching a glass table. For example, an activity like paragliding could be matched with the VR experience of flying like a bird. The VR content can then be synchronized to the real haptic experience, which is unpredictable.

Some embodiments described herein provide a more immersive, better optimized experience by adapting a VR simulation to real-world environmental haptic effects. In other embodiments, unwanted haptic effects are counteracted, which also helps to maintain an immersive environment during a VR simulation. Some embodiments may provide generated haptic effects in addition to environmental haptic effects in order to provide a more immersive simulation.

GENERAL CONSIDERATIONS

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a sensor;
   a virtual reality display;
   a non-transitory computer-readable medium; and
   a processor coupled to the non-transitory computer-readable medium, the sensor and the virtual reality display, the processor configured to execute processor-executable instructions stored in the non-transitory computer-readable medium to:
   receive one or more sensor signals from the sensor;
   determine a real-world environmental haptic effect uncontrolled by a user based on one or more of the one or more sensor signals;
   determine a proper haptic effect for a virtual object based on a characteristic of the virtual object;
   determine a modified haptic effect based on the proper haptic effect and the real-world environmental haptic effect; and
   transmit a display signal to the virtual reality display, the display signal associated with the modified haptic effect.

2. The system of claim 1, further comprising a haptic output device coupled to the processor and wherein the processor is further configured to execute processor-executable instructions stored in the non-transitory computer-readable medium to determine a haptic signal based at least in part on the modified haptic effect and transmit the haptic signal to the haptic output device.

3. The system of claim 1, wherein the sensor comprises at least one of a camera, a laser, a radar, an accelerometer, a gyrometer, a gyroscope, a pressure sensor, a magnetic sensor, a light sensor, or a microphone.

4. The system of claim 1, wherein the virtual reality display comprises a virtual reality headset.

5. The system of claim 1, wherein the real-world environmental haptic effect corresponds to a feature on a surface of a real-world object.

6. The system of claim 1, wherein the real-world environmental haptic effect corresponds to at least one of a feature on a surface of a real-world object.

7. A method comprising:
   receiving one or more sensor signals from a sensor;
   determining a real-world environmental haptic effect uncontrolled by a user based on one or more of the one or more sensor signals;
   determining a proper haptic effect for a virtual object based on a characteristic of the virtual object;
   determining a modified haptic effect based on the proper haptic effect and the real-world environmental haptic effect; and
   transmit a display signal to a virtual reality display, the display signal associated with the modified haptic effect.

8. The method of claim 7, further comprising determining a haptic signal based at least in part on the modified haptic effect and transmitting the haptic signal to a haptic output device.

9. The method of claim 7, wherein the sensor comprises at least one of a camera, a laser, a radar, an accelerometer, a gyrometer, a gyroscope, a pressure sensor, a magnetic sensor, a light sensor, or a microphone.

10. The method of claim 7, wherein the virtual reality display comprises a virtual reality headset.

11. The method of claim 7, wherein the real-world environmental haptic effect corresponds to a feature on a surface of a real-world object.

12. The method of claim 7, further comprising determining the modified haptic effect based at least in part on a probabilistic scenario.

13. A non-transitory computer readable medium comprising processor-executable program code, which when executed by a processor is configured to cause the processor to:
   receive one or more sensor signals from a sensor;
   determine a real-world environmental haptic effect uncontrolled by a user based on one or more of the one or more sensor signals;
   determine a proper haptic effect for a virtual object based on a characteristic of the virtual object;

determine a modified haptic effect based on the proper haptic effect and the real-world environmental haptic effect; and transmit a display signal to a virtual reality display, the display signal associated with the modified haptic effect.

* * * * *